(12) United States Patent
Long

(10) Patent No.: US 6,802,193 B1
(45) Date of Patent: Oct. 12, 2004

(54) REMOVABLE STEERING WHEEL DEVICE

(76) Inventor: Isaac N. Long, 234 Sand St. #3A, Brooklyn, NY (US) 11201-1542

( * ) Notice: Subject to any disclaimer, the term of this patent is extended or adjusted under 35 U.S.C. 154(b) by 0 days.

(21) Appl. No.: 10/671,206

(22) Filed: Sep. 25, 2003

(51) Int. Cl.[7] ............................................... E05B 13/10
(52) U.S. Cl. .............................. 70/207; 70/209; 70/218; 74/552; 292/352; 403/353
(58) Field of Search .......................... 70/207, 209, 218, 70/DIG. 57, 223–225; 180/78; 280/771; 74/552; 292/348, 352, 354; 403/353, 381, 348, 349

(56) References Cited

U.S. PATENT DOCUMENTS

| | | | |
|---|---|---|---|
| 742,562 A | * 10/1903 | Becraft | 301/108.5 |
| 2,568,370 A | * 9/1951 | Scuderi | 301/9.1 |
| 4,441,344 A | 4/1984 | Kurpershoek | 70/231 |
| 4,601,182 A | 7/1986 | Glanzmann | 70/252 |
| 4,881,389 A | * 11/1989 | Alfon et al. | 70/209 |
| 4,887,484 A | 12/1989 | Peng | 74/556 |
| 5,103,660 A | 4/1992 | Johnson | 70/209 |
| 5,345,797 A | 9/1994 | Hayes | 70/218 |
| 5,409,256 A | * 4/1995 | Gordon et al. | 280/728.2 |
| 5,419,585 A | * 5/1995 | Breed et al. | 280/731 |
| 5,427,406 A | * 6/1995 | Zushi et al. | 280/728.2 |
| 5,501,484 A | * 3/1996 | Saderholm et al. | 280/728.2 |
| 5,772,241 A | * 6/1998 | Heilig | 280/731 |
| 5,855,451 A | * 1/1999 | Milton et al. | 403/348 |
| 6,189,920 B1 | * 2/2001 | Bayley | 280/731 |

FOREIGN PATENT DOCUMENTS

GB 2037242 * 7/1980 ................... 70/226

* cited by examiner

Primary Examiner—Lloyd A. Gall

(57) ABSTRACT

A removable steering wheel device for permitting removal of the steering wheel to make the vehicle undriveable and thus undesirable to a potential thief. The removable steering wheel device includes a steering wheel having a boss engageable with an upper end of a steering column of the vehicle. The boss includes a bore and a base wall at the bottom of the bore. A bayonet connection assembly for removably connecting the boss to the upper end of the steering column. A locking cap disposed within the bore for fixing the bayonet connection between the boss and the upper end. The locking cap including an assembly for preventing rotation of the boss relative to the upper end, and including an assembly for fixing the locking cap within the bore.

8 Claims, 4 Drawing Sheets ns 30 contact the ends of the slots 23 thereby allowing a pair of pins, to be later described, to be positioned in the holes 25, 31 to prevent rotation of the boss 20 relative to the column 16.

REMOVABLE STEERING WHEEL DEVICE

BACKGROUND OF THE INVENTION

1. Field of the Invention

The present invention relates to vehicle anti-theft devices and more particularly pertains to a new removable steering wheel device for permitting removal of the steering wheel to make the vehicle undriveable and thus undesirable to a potential thief.

2. Description of the Prior Art

The use of vehicle anti-theft devices is known in the prior art. U.S. Pat. No. 5,345,797 describes a device for permitting a steering wheel to be removed from the steering wheel. Another type of vehicle anti-theft device is U.S. Pat. No. 5,103,660 having a steering wheel that is removable and the ignition and also includes a cover to prevent another steering wheel being connected to the vehicle. U.S. Pat. No. 4,887,484 has a ring and arm that are selectively coupled to a hub on the steering column to inhibit the theft of the vehicle. U.S. Pat. No. 4,601,182 has a steering wheel is selectively disengaged from the steering column to inhibit steering of the vehicle when the vehicle is being stolen. U.S. Pat. No. 4,441,344 has an attachment means for joining two objects together and locking them together.

While these devices fulfill their respective, particular objectives and requirements, the need remains for a device that has certain improved features that allow for a steering wheel to be easily removed from a steering column.

SUMMARY OF THE INVENTION

The present invention meets the needs presented above by providing a steering wheel having a boss connected to the steering column by a bayonet-type of connection, and a locking cap selectively fixed within the boss which prevents rotation of the boss relative to the steering column.

Still yet another object of the present invention is to provide a new removable steering wheel device that permitting removal of the steering wheel to make the vehicle undriveable and thus undesirable to a potential thief.

To this end, the present invention generally comprises a steering wheel having a boss engageable with an upper end of a steering column of the vehicle. The boss includes a bore and a base wall at the bottom of the bore. A bayonet connection assembly for removably connecting the boss to the upper end of the steering column. A locking cap disposed within the bore for fixing the bayonet connection between the boss and the upper end. The locking cap including an assembly for preventing rotation of the boss relative to the upper end, and including an assembly for fixing the locking cap within the bore.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
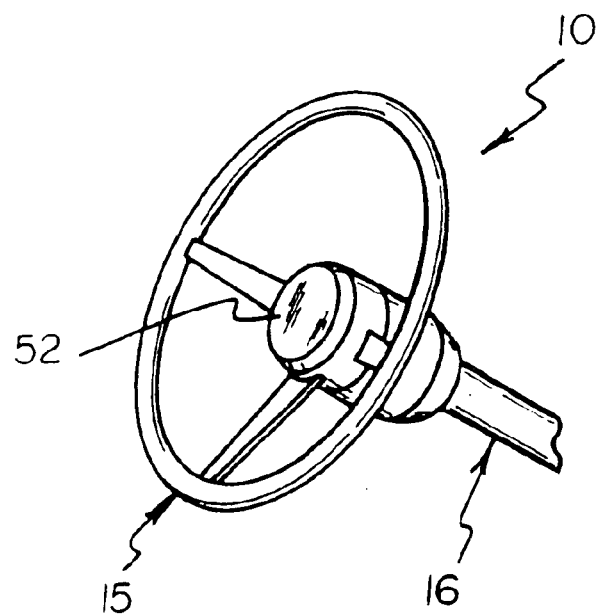
FIG. 1 is a right side perspective view of a new removable steering wheel device according to the present invention.

With reference now to the drawings, and in particular to FIGS. 1 through 9 thereof, a new removable steering wheel device embodying the principles and concepts of the present invention and generally designated by the reference numeral 10 will be described.

As best illustrated in FIGS. 1 through 9, the removable steering wheel device 10 generally comprises a steering wheel 15 which is designed to be attached to a vehicles steering column 16 for steering the vehicle.

As best illustrated in FIGS. 1 through 9, it can be shown that the steering wheel 15 includes a cylindrical center boss 20 by which the steering wheel is attached to the column 16. The boss 20 defines a bore 21 therein which is closed at the bottom by a base wall 22. The base wall 22 includes a plurality of equally circumferentially spaced, elongated slots 23 therein, which form a portion of a bayonet connection with the column 16. Four slots 23 are illustrated, however a larger or smaller number of slots could be used. The slots 23 include an enlarged portion 24 at one end thereof the purpose of which will become apparent later in the description. The base wall 22 further includes a pair of diametrically opposite holes 25 which receive a pair of pins to be later described for preventing rotation of the boss relative to the column.

The column 16 includes an upper end 26 which is engaged with the boss 20. The upper end 26 includes a plurality of studs 27 extending from an upper wall 28 of the end 26. The number of studs 27 corresponds to the number of slots 23, and in the illustrated invention comprises four studs. Each stud 27 includes an enlarged head portion 29 disposed on top of a narrow region 30. The studs 27 form the other portion of the bayonet connection. By aligning the enlarged slot portions 24 with the enlarged heads 29, the heads 29 can fit through the portions 24 by moving the boss towards the column. The boss 20 is then rotated in a counterclockwise direction until the narrow regions 30 contact the end of the slots 23. Such a connection is termed a bayonet connection and the operation of such connections are well known in the art. The wall 28 also includes a pair of diametrically opposite holes 31 extending therethrough which are located such that they are aligned with the holes 25 when the narrow regions 30 are at the ends of the slots 23. The holes 31 also receive the pins mentioned above.

As is clear from the description so far, the boss is connected to the column by disposing the enlarged heads 29 through the portions 24, and then rotating the boss until the narrow portions 30 are at the ends of the slots 23. It is clear that in order to operate the steering wheel, the elements must be locked at this rotated position. A locking cap 32 is provided for this purpose.

The locking cap 32 is a generally hollow, cylindrical member sized for fitting within the bore 21. The cap includes a pair of diametrically opposite studs 33 extending from the bottom thereof which fit within respective aligned holes 25, 31. By disposing the studs 33 through the holes 25, 31, the boss and column are prevented from rotating relative to each other, thus maintaining the bayonet connection.

As stated previously, the cap 32 fits within the bore such that the studs 33 extend through the holes. A means must be provided to maintain the cap within the bore. Such a means comprises a pin 34 which engages with a suitably located aperture in the boss 20. The pin 34 extends through an aperture 35 in a side wall 36 of the cap. The pin 34 includes a disk 37 attached thereto inside the cap which prevents the pin from being removed out of the cap through the aperture 35. A support 39 is disposed within the hollow cap and supports one end of the pin 34 which extends through a hole 40 in the support 39. The pin 34 includes a pair of arms 41,42 extending at right angles thereto on the other side of the support 39. A spring 43 is disposed around the pin between the support 39 and the disk 37, to bias the pin 34 outward and-into engagement with the boss.

An actuation means 38 is provided to actuate the pin 34 into and out of engagement with the boss against the bias of the spring 43. The actuation means 38 comprises a pivoting, L-shaped lever having a first, finger portion 44 and a second, pin engaging portion 45. The top of the cap includes a pair of ears 46,47 extending upwardly therefrom. The lever includes an enlarged portion 48 between the portions 44,45 which is disposed between the ears 46,47 and pivotally attached thereto by pivot pin 49. The portion 45 includes a clevis 50 at its end which is configured to fit around the pin 34 and the arms 41,42. The free end of the finger portion 44 includes a raised section 51 permitting a persons finger to be inserted under the portion 44 and thus pivoted.

By inserting a finger under the section 51 and pulling upward thereon, the L-shaped lever is pivoted about the pin 49. The clevis 50 is thus moved to the position shown in dashed lines in FIG. 8, pulling the pin 34 to the left and thus disengaging the pin from the boss. The cap 32 can then be removed from the bore, permitting the bayonet connection to be disengaged and the boss detached from the column. When the lever is released, the spring bias the lever and the pin to the engaged position, thus preventing removal of the cap from the bore.

Figure 2:
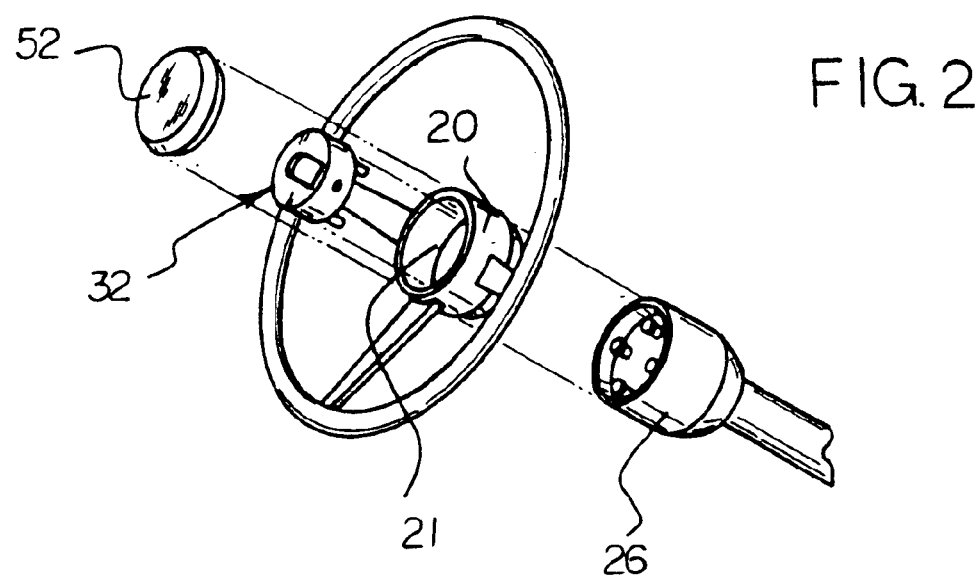
FIG. 2 is an exploded perspective view of the present invention.
Figure 3:
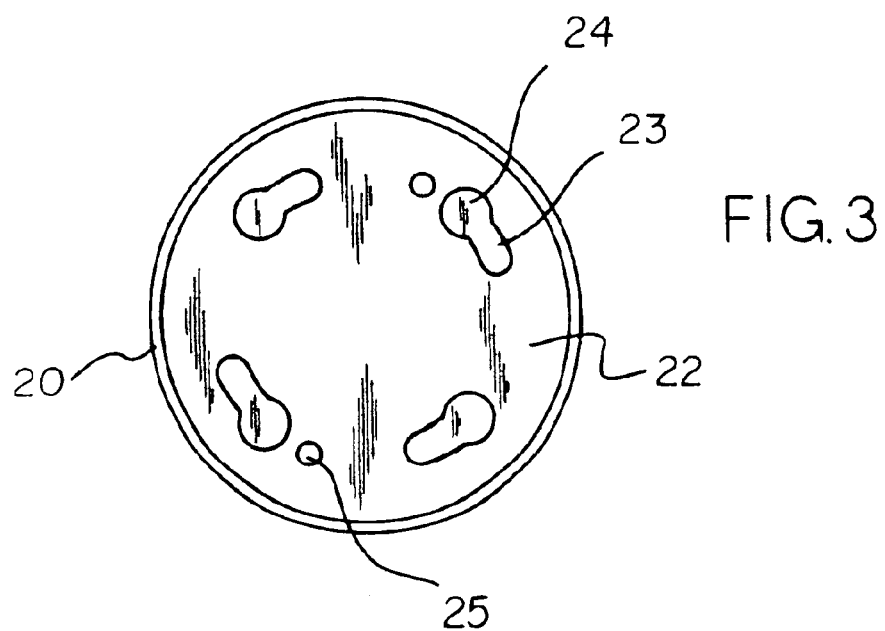
FIG. 3 is a bottom view of the boss of the present invention.
Figure 4:
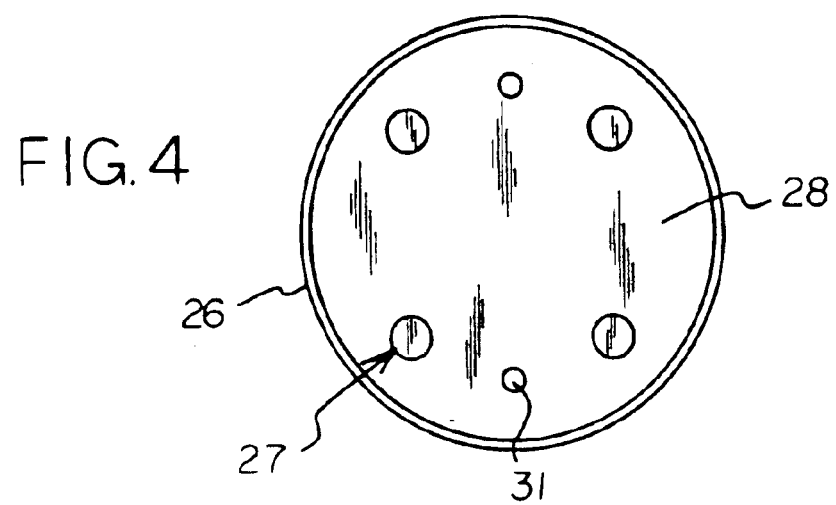
FIG. 4 is a top view of the steering column of the present invention.
Figure 5:
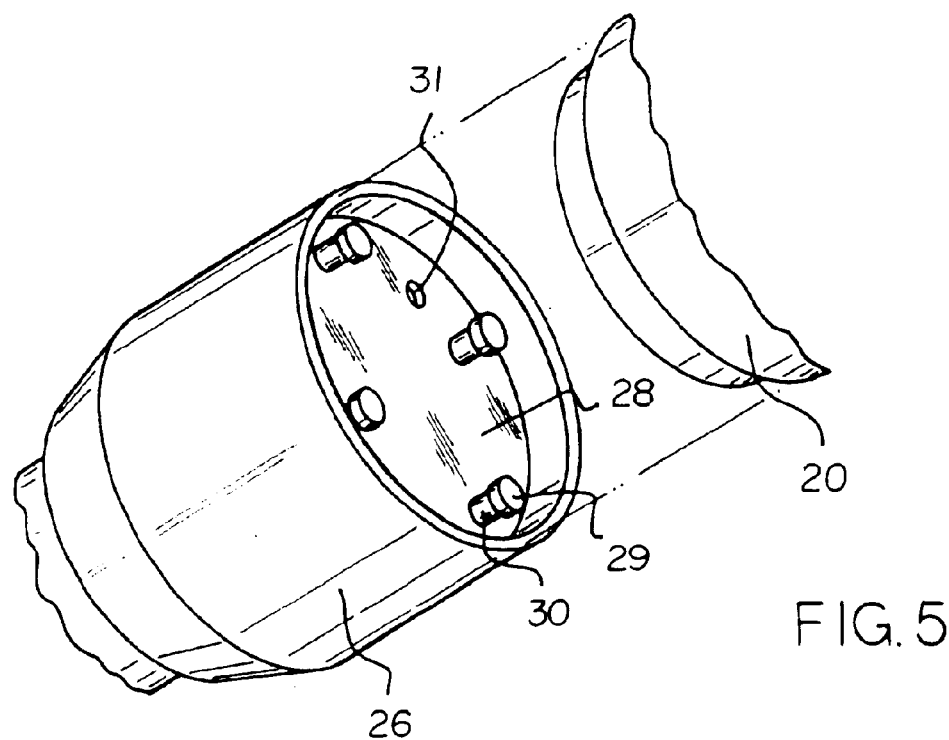
FIG. 5 is a perspective view of the steering column and the bottom of the boss of the present invention.
Figure 6:
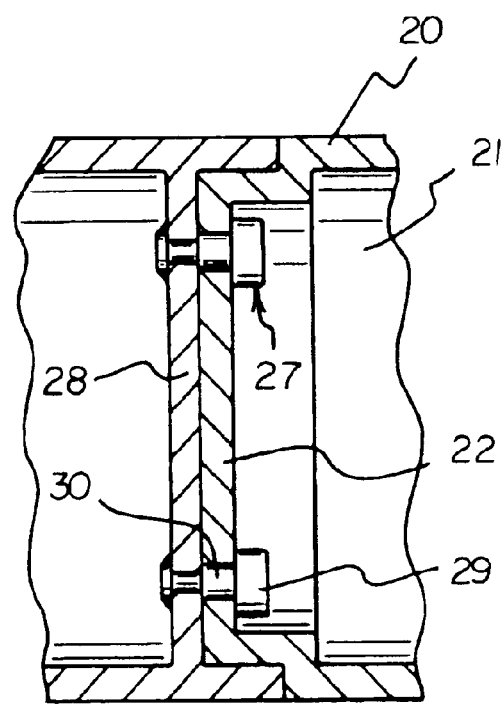
FIG. 6 is a cross-sectional view of the boss of the present invention when the boss is coupled to the steering column.
Figure 7:
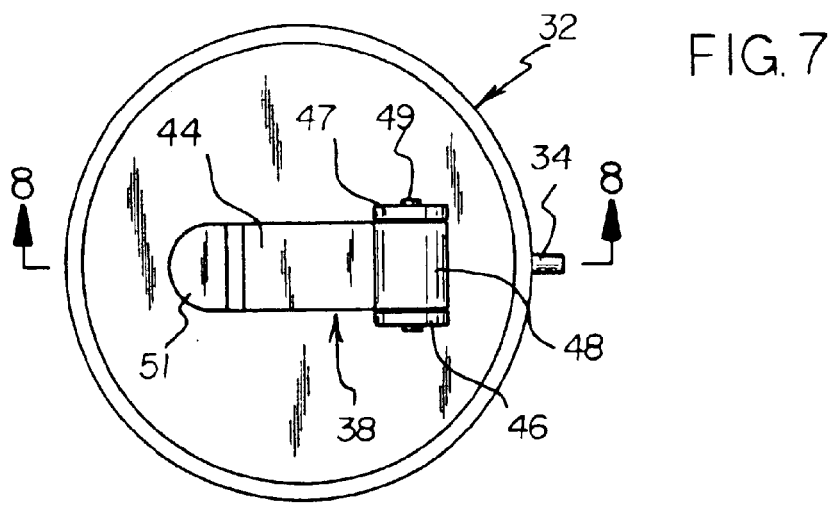
FIG. 7 is a top view of the locking cap of the present invention.
Figure 8:
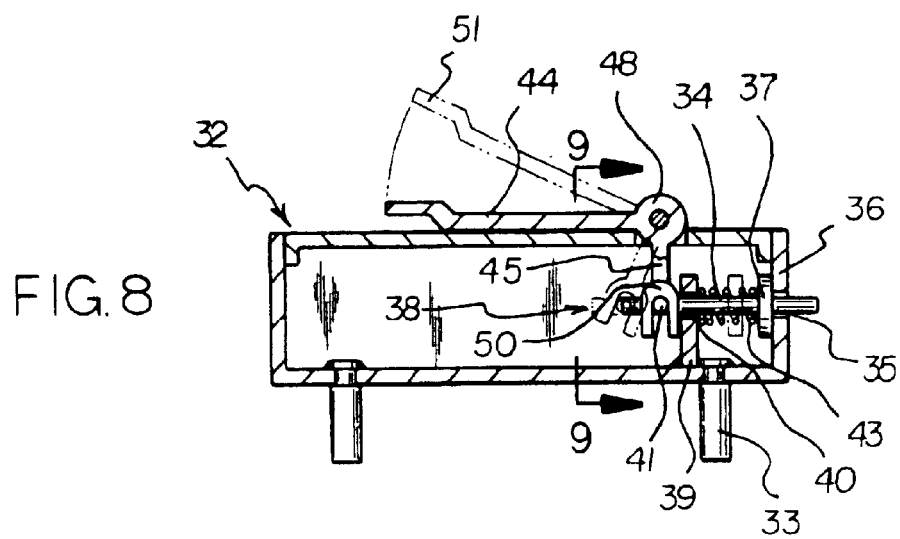
FIG. 8 is a cross-sectional view of the present invention taken along 8—8 of FIG. 7.
Figure 9:
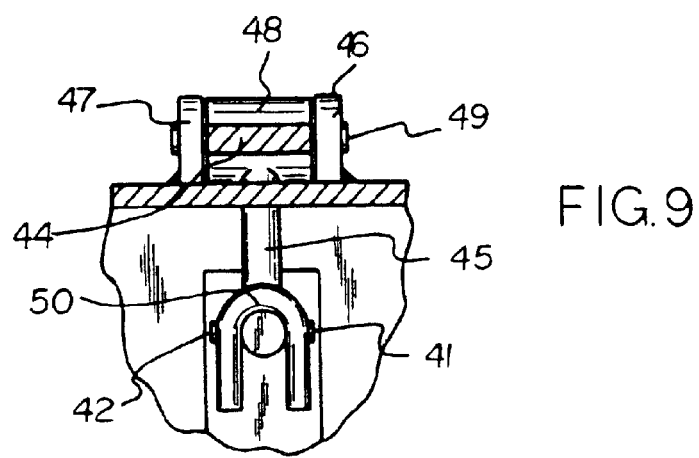
FIG. 9 is a cross-sectional view of the present invention taken along line 9—9 of FIG. 8.

As best shown in FIGS. 1 and 2, when the boss is connected to the column and the locking cap is disposed within the bore, a covering cap 52 is attached to the boss 20, such as by a snap connection, so as to close the open end of the bore and enhance the appearance of the steering wheel. The cap 52 is easily attached and removed by hand, so as to permit access to the locking cap.

In use, the connects the boss of the steering wheel to the column using the bayonet connection. The locking cap is the coupled within the bore to secure the steering wheel to the steering column and allow the steering wheel to turn the steering column to allow the vehicle to be steered. A cover cap is then coupled to the steering wheel to cover the locking cap. The steering wheel can be removed by reversing the steps taken to secure the steering wheel to the steering column and thereby making the vehicle more difficult to steal when the user is not driving the vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An anti-theft device for a motor vehicle, comprising:
   a steering wheel having a boss engageable with an upper end of a steering column of the vehicle, the boss including a bore and a base wall at the bottom of the bore;
   bayonet connection means for removably connecting the boss to the upper end of the steering column; and
   a locking cap disposed within the bore for fixing the bayonet connection between the boss and the upper end, the locking cap including means for preventing rotation of the boss relative to the upper end, and including means for fixing the locking cap within the bore.

2. The anti-theft device for a motor vehicle of claim 1, wherein the bayonet connection means comprises a plurality of elongated slots in the base wall and a corresponding plurality of studs extending from the upper end of the steering column and engaged within the slots.

3. The anti-theft device for a motor vehicle of claim 1, wherein the further comprising a covering cap attached to the boss for closing the top of the bore.

4. The anti-theft device for a motor vehicle of claim 1, wherein the rotation preventing means comprises a plurality of locking holes in the base wall and a corresponding plurality of locking holes in the upper end of the steering column, the holes in the base wall being aligned with the holes in the upper end when the boss is connected to the steering column, and a corresponding plurality of studs extending from the locking cap and disposed within the aligned holes.

5. The anti-theft device for a motor vehicle of claim 1, wherein the fixing means comprises a pin engaged with the boss.

6. The anti-theft device for a motor vehicle of claim 5, further comprising an actuating means for actuating the pin into and out of engagement with the boss.

7. The anti-theft device for a motor vehicle of claim 6, wherein the actuating means comprises a finger operated lever pivotally attached to the locking cap and operatively engaged with the pin for actuating the pin upon pivoting movement of the lever.

8. An anti-theft device for a motor vehicle, comprising:
   a steering wheel having a boss engageable with an upper end of a steering column of the vehicle, the boss including a bore and a base wall at the bottom of the bore;

bayonet connection means for removably connecting the boss to the upper end of the steering column;

a locking cap disposed within the bore for fixing the bayonet connection between the boss and the upper end, the locking cap including means for preventing rotation of the boss relative to the upper end, and including means for fixing the locking cap within the bore;

wherein the bayonet connection means comprises a plurality of elongated slots in the base wall and a corresponding plurality of studs extending from the upper end of the steering column and engaged within the slots;

a covering cap being attached to the boss for closing the top of the bore;

wherein the rotation preventing means comprises a plurality of locking holes in the base wall and a corresponding plurality of locking holes in the upper end of the steering column, the holes in the base wall being aligned with the holes in the upper end when the boss is connected to the steering column, and a corresponding plurality of studs extending from the locking cap and disposed within the aligned holes;

wherein the fixing means comprises a pin engaged with the boss;

an actuating means for actuating the pin into and out of engagement with the boss; and wherein the actuating means comprises a finger operated lever pivotally attached to the locking cap and operatively engaged with the pin for actuating the pin upon pivoting movement of the lever.

* * * * *